United States Patent Office 3,428,577
Patented Feb. 18, 1969

3,428,577
FLAME-RESISTANT POLYURETHANE PLASTICS
Rudolf Merten and Otto Bayer, Leverkusen, Gunther Braun, Cologne-Flittard, and Hermann Kaiser, Leverkusen, Germany, assignors to Farbenfabriken Bayer Aktiengesellschaft, Leverkusen, Germany, a German corporation
No Drawing. Filed Feb. 10, 1965, Ser. No. 431,720
Claims priority, application Germany, Feb. 14, 1964,
F 42,005
U.S. Cl. 260—2.5                9 Claims
Int. Cl. C08g 22/44; C09k 3/28

ABSTRACT OF THE DISCLOSURE

Flame-resistant polyurethane plastics based on phosphorus containing hydroxyl compounds which are prepared by reacting a phosphorus acid, an alkylene oxide and an alpha, beta-unsaturated carboxylic acid. The phosphorus polyols lead to the production of cellular polyurethane plastics which have better flame-resistance and in addition the phosphorus polyol makes it possible to prepare cellular polyurethane plastics without the necessity for special mixing equipment or special precautions.

---

This invention relates to polyurethane plastics and more particularly to flame-resistant polyurethane plastics which are preferably porous plastics or in other words polyurethane foams.

The preparation of polyurethane plastics having a wide range of physical properties is now a large scale commercial endeavor. With suitable choice of components, it is possible to prepare either rigid or flexible polyurethane foam products with various intermediate ranges of flexibility from semi-flexible to semi-rigid. The polyurethanes are disclosed in Ang. Chemie, vol. 59, page 257 (1948).

The polyurethane foams are preferably prepared by mixing liquid components in either a single stage or by preparing a prepolymer of the isocyanate and active hydrogen containing compound which is then reacted with water in a second stage to prepare a polyurethane foam. It is often desirable to impart flame resistance to polyurethane plastics since due to their high content of carbon they are quite flammable in the absence of special flame retardant additives or ingredients.

It has been proposed heretofore to use phosphorous containing isocyanates and/or phosphorous containing polyols for the purpose of imparting flame resistance to polyurethane plastics. Generally speaking, the phosphorous additives result in difficulty because they make the mixing of the components of a polyurethane foam difficult. For example, dihydroxy alkyl phosphite prepared by the alkoxylation of phosphorous acid or by ester interchange processes make the foaming process difficult. Furthermore, when the dihydroxy aryl phosphites are converted into trihydroxy alkyl phosphites in the presence of an alkaline catalyst, the alkaline catalyst interferes with the foaming process unless the catalyst is first removed in an additional stage.

It is, therefore, an object of this invention to provide flame resistant polyurethane plastics which are an improvement over those heretofore known; particularly with regard to the disadvantages set forth above. Another object of this invention is to provide an improved process for the incorporation of a flame-proofing agent into a polyurethane plastic. Another object of this invention is to provide improved cellular polyurethane plastics and an improved process for the preparation thereof. Still another object of this invention is to provide phosphorous containing polyols adapted for the preparation of polyurethane plastics with less difficulty particularly in the mixing stage. Another object of this invention is to provide cellular polyurethane plastics having improved physical properties in addition to their flame resistant properties.

The foregoing objects and others which will become apparent from the following description are accomplished, generally speaking, by providing flame resistant polyurethane plastics prepared by reacting the organic polyisocyanate with a phosphorous containing hydroxyl compound as more particularly defined below and said phosphorous containing polyhydroxyl compound which have been prepared by reacting inter alia a phosphorous acid and an alkylene oxide or a dialkyl phosphite with an alpha,beta-unsaturated carboxylic acid or a halogenated acid. Therefore, the present invention contemplates the preparation of cellular polyurethane plastics having improved flame resistant properties wherein an organic polyisocyanate is reacted with a phosphorous containing polyhydroxy compound in the presence of a blowing agent. The phosphorous containing polyhydroxy compound employed in the preparation of the polyurethane plastics of thisi nvention can, for example, be prepared by reacting a dialkyl phosphite with an alpha,beta-unsaturated dicarboxylic acid. Moreover, the polyhydroxyl compound may result from the reaction of a phosphorous acid with an alkylene oxide and an alpha,beta-unsaturated dicarboxylic acid. Still further, the phosphorous containing polyhydroxyl compound may be the reaction product of carboxylic acids which may be alpha,beta-unsaturated or halogenated, with phosphorous acids and alkylene oxides. By following the teachings of this present invention, phosphorous containing polyhydroxyl compounds can be prepared based on phosphorous acids which are in practice waste products and which may be used in aqueous form together with naturally occurring free fatty acids or the more refined acids which are halogenated or which contain alpha,beta-unsaturation as more particularly described below. The resulting polyhydroxyl compound does not have the incompatibility problem which results with the heretofore known phosphorous containing compounds even when aqueous phosphorous acid solutions are used, since the water in the reaction mixture is converted into compatible glycols by reaction of the water with the alkylene oxide. Further, where fatty acids are used the odor thereof, which is often found to be disturbing in polyurethane formulations where they are used, is reduced. Another advantage of the phosphorous containing polyhydroxyl compounds of the present invention is that they have an extremely low viscosity.

Thus, surprisingly, it has been found that these polyhydroxyl compounds not only lead to considerably better flame protection than other compounds having comparable phosphorous content, but in addition, the mixture of reaction products produced have a high degree of compatibility with other components of the foamed plastics and can be foamed by reaction with a polyisocyanate in the presence of a blowing agent without any difficulty. Still another advantage is the use of the catalyst particularly the alkaline catalyst heretofore used to prepare adducts of phosphorous acid, dialkyl esters and alpha, beta-unsaturated esters which must subsequently be removed is avoided. Also, the addition reaction, which is accompanied by an increase in viscosity which is generally disadvantageous in the subsequent foaming reaction is avoided.

Where the phosphorous containing polyhydroxyl compounds of the invention are prepared by reacting a phosphorous acid, an alkylene oxide and an alpha-beta-unsaturated carboxyclic acid, the compounds may be prepared by first alkoxylating the phosphorous acid and then reacting this alkoxylated product with alkylene oxide adducts of alpha,beta-unsaturated carboxylic acids or one may partially react the alkylene oxide with a mixture of a phosphorous acid and an alpha,beta-unsaturated carboxylic acid. Where a phosphorous ester is used, it may be obtained by direct alkoxylation of phosphorous acid, its pyroformic compounds or its aqueous solutions preferably in concentrations above about 60% at elevated temperatures for example, between about 40 to 100° C. The ratio of alkylene oxide to phosphorous acid may vary within wide limits but generally at least about two mols of alkylene oxide is employed per mol of phosphorous acid. The phosphorous content of the alkoxylation product is preferably at least about 2.5% by weight. Where the polyhydroxyl compounds are prepared by merely using the alkoxylation product of a mixture of phosphorous acid, an alpha,beta-unsaturated carboxylic acid or mixtures thereof or anhydrides, it is possible to pre-mix the phosphorous acid and the carboxylic acid or all three components may be added simultaneously to a solvent, as more particularly set forth below particularly at temperatures between about 40 to 100° C. The solvent may later be removed. The presence of water in limited quantities does not interfere with the process and has the advantage of providing simpler addition of the phosphorous acid in liquid form. The water in the mixture partly reacts to form the corresponding glycol which reacts in the usual manner in the foaming process and partly reacts into the phosphorous compound.

For the preparation of polyhydroxyl compounds based on the carboxylic acids having only one acid group per molecule, it is desirable to place the acid in a reaction vessel and then add the phosphorous acid and the alkylene oxide dropwise from separate containers at the same time at elevated temperatures of from 50 to 150° C. The total amount of alkylene oxide may be added in this way. A pre-product may be further alkoxylated without simultaneous addition of phosphorous acid in order to provide more compatible polyhydroxyl compounds. Alternatively, as pointed out above, the alkylene oxide may be added to a mixture of carboxylic acid and the phosphorous acid.

Where the product is prepared by the simultaneous addition of all three components to a reaction mixture, a solvent is desirable and the solvent may be an aromatic compound, an aliphatic compound, a ketone, an ether, a chlorinated hydrocarbon or any other inert organic solvent. Specific examples of solvents are benzene, benzine, toluene, xylene, hexane, heptane, octane, methylethyl ketone, the diethyl ether of diethylene glycol, o-dichlorobenzene, methylene chloride and the like. The solvent should be inert to the reactants and to the product and stable at the temperature of the reaction and preferably should be liquid at temperatures of from about 40 to 100° C.

Any suitable carboxylic acid containing alpha-beta-unsaturation and/or halogenation may be used. Alpha, beta-ethylenically unsaturated carboxylic acids and preferably mono- or di-carboxylic acids are preferred. Any suitable acid of this type may be used including, for example, octanic acid, isooctanic acid, palmitic acid, stearic acid, oleic acid, lineoleic acid, linolenic acid, crude or distilled tall oil fatty acid, fish fatty acid obtained by saponification of fish oils, abietic acid or the commercial grades of colophony derived from them as disclosed in Ullmann Encyclopedia der technischen Chemie (1967); Urban und Achwarzenberg, Munich-Berlin, vol. 8, pages 400 to 415.

The compositions of some acids which are suitable are given below in Table I. Further acids are those which have been substituted by halogen, for example, by adding halogen to the unsaturated carboxylic acids or mixtures thereof. Suitable halogens are chlorine, bromine, iodine and the like. Additional acids are maleic acid, fumaric acid, aconitic acid, itaconic acid, chloromaleic acid and the like.

Any suitable phosphorous acid may be used, but it is preferred to use phosphorous acid which corresponds to a mixture of about 35 to 67% $P_2O_3$ and 33 to 65% $H_2O$.

TABLE I

| | Titre, °C. | | Acid Number | | Iodine Number | | Approximate composition in percent saturated | | | | | | | | Unsaturated | | | |
|---|---|---|---|---|---|---|---|---|---|---|---|---|---|---|---|---|---|---|
| | Min. | Max. | Min. | Max. | Min. | Max. | $C_6$ | $C_8$ | $C_{10}$ | $C_{12}$ | $C_{14}$ | $C_{16}$ | $C_{18}$ | $C_{20-22}$ | $C_{14}$ | $C_{16}$ | $C_{18}$ | $C_{20-22}$ |
| Cotton seed oil fatty acid | 32 | 38 | 202 | 209 | 90 | 105 | | | | 2 | 2 | 24 | 2 | | | | 71 | |
| Ground nut oil fatty acid | 24 | 30 | 198 | 206 | 86 | 102 | | | | | 2 | 7 | 3 | 5 | | | 83 | |
| Coconut oil fatty acid | 22 | 26 | 262 | 272 | 6 | 12 | 8 | 8 | 7 | 48 | 18 | 9 | 2 | | | | 8 | |
| Hardened coconut oil fatty acid | 24 | 28 | 262 | 272 | | | 2 | 8 | 8 | 7 | 48 | 18 | 9 | 10 | | | | |
| Palm kernal oil fatty acid | 22 | 28 | 252 | 266 | 14 | 20 | 4 | 4 | 6 | 49 | 14 | 8 | 2 | | | | 17 | |
| Hardened palm kernal oil fatty acid | 24 | 28 | 252 | 266 | | | 2 | 4 | 4 | 6 | 49 | 14 | 8 | 19 | | | | |
| Palm oil fatty acid | 43 | 48 | 202 | 210 | 46 | 53 | | | | | 3 | 42 | 4 | | | | 51 | |
| Rape seed oil fatty acid | 15 | 20 | 192 | 200 | 85 | 105 | | | | | | 10 | 1 | | | | 52 | 37 |
| Soybean oil fatty acid | 22 | 28 | 200 | 206 | 100 | 125 | | | | | | | 15 | 4 | | | 81 | |
| Tallow fat fatty acid | 39 | 42 | 203 | 211 | 44 | 59 | | | | | | 3 | 31 | 19 | | | 47 | |
| Sperm oil fatty acid | 18 | 22 | 209 | 215 | 48 | 73 | | 1 | | 7 | 8 | 10 | 2 | | 6 | 21 | 31 | 14 |
| Train oil fatty acid | 25 | 35 | 10.5 | 207 | 90 | 125 | | | | 2 | 7 | 14 | 2 | | 1 | 10 | 34 | 30 |
| Slightly hardened train oil fatty acid | 28 | 33 | 198 | 207 | 68 | 80 | | | | 2 | 8 | 16 | 4 | 5 | 1 | 8 | 32 | 25 |
| Do | 40 | 42 | 198 | 207 | 38 | 50 | | | | 2 | 8 | 22 | 12 | 16 | | 2 | 24 | 14 |
| Do | 44 | 46 | 198 | 207 | 20 | 30 | | | | 2 | 8 | 22 | 24 | 24 | | 2 | 12 | 6 |

Any suitable alkylene oxide may be used such as, ethylene oxide, propylene oxide, butylene oxide, epichlorohydrin, styrene oxide and the like. In addition, one may use esters from the corresponding alpha, beta-unsaturated dicarboxylic acids or their anhydrides and the 1,2-diols of polyether glycol, from which the alkylene oxides are derived such as ethylene glycol, diethylene glycol, polyethylene glycol-500, propylene glycol, polypropylene glycol-550, by esterification for example in the ratio of from 1:2 at temperatures of from about 150 to 200° C. The preferred starting materials for the polyols to be employed in the process of the present invention are propylene oxide, maleic acid anhydride and phosphorous acid. It is also often desirable to use an aqueous mixture. The product from these ingredients may advantageously be prepared by the continuous reaction of aqueous phosphorous acid, maleic acid anhydride and propylene oxide, and may possibly be followed by subsequent treatment with more propylene oxide to make the product even more compatible with the balance of the components for the preparation of the polyurethane plastic.

The components are preferably so adjusted that at least 1 mol and better between 1 to 10 mols of alpha, beta-unsaturated carboxylic acid is used per mol of dialkyl phosphite group. The quantity of alkylene oxide should be at least equivalent to the quantity of starting material i.e. at least 2 mols of alkylene oxide should be used per mol of phosphorous acid and per mol of water, i.e. one mol of water and one mol of phosphorous acid requires four mols of alkylene oxide. The anhydrides need not be regarded as starting components since they become added to —OH groups whereas free carboxylic acids are to be regarded as functional.

The phosphorous containing polyhydroxyl compounds obtained in the first stage are low viscosity usually water white liquids which preferably have an hydroxyl content of from about 3 to 25% by weight, most preferably between 5 to 25% by weight.

To further increase the flame resistance of the polyurethane plastic, the starting material may contain additional halogen either as a result of using halogen containing starting components such as chloromaleic acid or epichlorohydrin or as a result of partial halogenation with, for example, chlorine or bromine, of the unsaturated groups present. It is important, however, and preferred to maintain the proportions given above between the dialkylene phosphite groups and the alpha, beta-unsaturated ester groups.

In the production of the polyurethane plastics of the present invention, the phosphorous containing polyhydroxyl compound is reacted with an organic polyisocyanate either alone or in conjunction with other active hydrogen compounds or additives to form the polyurethane. If foam materials are desired, a blowing agent is included in the reaction mixture and foam materials are a preferred embodiment of this invention.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl groups and the like. Also, compounds may be used which contain one —SH group and one —OH group or two —OH groups and one —SH group as well as those which contain an amino group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below 500. Aliphatic diols and triols are most preferred for this purpose.

Any suitable hydroxyl polyester may be used such as for example, those obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebasic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethyl succinic acid, isophthalic acid, terephthalic acid, hemimellitic acid, trimellitic tcid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3, 6-hexane triol, triethanol amine, pentaerythritol, sorbitol and the like.

Any suitable polyhydric polyalkylene ether may be used such as, for example, the condensation product of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process as, for example, the process disclosed by Wurtz in 1859 and in Encyclopedia of Chemical Technology, volume 7, pages 257 to 262, published by Interscience Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable organic polyisocyanate may be used such as, for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, n-butylene diisocyanate, hexamethylene diisocyanate, m-xylylene diisocyanate, p-xylylene diisocyanate, 4,4-dimethyl-1,3-xylylene diisocyanate, cyclohexyl-1,4-diisocyanate, dicyclohexylmethane-4,4'-diisocyanate, m-phenylene diisocyanate, p-phenylene diisocyanate, 3-(alpha-isocyanatoethyl)-phenyl isocyanate, 2,6-diethylbenzene-1,4-diisocyanate, diphenyl-dimethylmethane-4,4'-diisocyanate, ethylene diisocyanate, ethylidene diisocyanate, propylene-1,2 - diisocyanate, cyclohexylene-1,2 - diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthylene diisocyanate, furfurylidene diisocyanate or polyisocyanates in a blocked or inactive form such as the bisphenyl carbamates of 2,4- or 2,6-toluylene diisocyanate, p,p'-diphenylmethane diisocyanate, p-phenylene diisocyanate, 1,5-naphthylene diisocyanate, p,p',p''-triisocyanato phenyl phosphate and the like. It is preferred to use the commercially available mixture of toluylene diisocyanates which contains 80% 2,4-toluylene diisocyanate and 20% 2,6-toluylene diisocyanate or 4,4'-diphenylmethane diisocyanate. The isocyanates may be used in refined or crude form such as crude toluylene diisocyanates as are obtained by the phosgenation of a mixture of toluylene diamines or crude diphenylmethane isocyanates such as those obtained by the phosgenation of crude diphenylmethane diamine.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The later type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula $$R'Si\begin{matrix}O(R_2SiO)_p(C_nH_{2n}O)_zR'' \\ -O(R_2SiO)_q(C_nH_{2n}O)_zR'' \\ O(R_2SiO)_r(C_nH_{2n}O)_zR''\end{matrix}$$

wherein R, R' and R'' are alkyl radicals having 1 to 4 carbon atoms; p, q and r each have a value of from 4 to 8 and $(C_nH_{2n}O)_z$ is a mixed polyoxyethylene oxypropylene group containing from 15 to 19 oxyethylene units and from 11 to 15 oxypropylene units with z equal to from about 26 to about 34. Most preferred is a compound having the formula

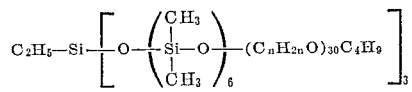

wherein $(C_nH_{2n}O)$ is a mixed polyoxyethylene and oxypropylene block copolymer containing about 17 oxyethylene units and about 13 oxypropylene units.

It is preferred to use a catalyst in the preparation of the polyurethane foam of the invention. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like. Other suitable catalysts are, for example, tin compounds such as stannous chloride, tin salts of carboxylic acids, such as dibutyl tin di-2-ethyl hexoate, stannous octoate, stannous oleate, as well as other organo metallic compounds such as are disclosed in U.S. Patent 2,846,408.

The polyurethane foam of the invention is useful for the production of various articles of commerce including foamed insulation such as sound and thermal insulation in the production of wall panels and the like. Moreover, the flexible plastics of the invention may be used for the preparation of cushions, air filters and the like. (All quantities given are parts by weight.)

General method for A1 to A4 (Table 2)

The carboxylic acid is added dropwise under inert gas at about 60 to 70° C. into the phosphoric acid and the alkylene oxide is then added at about 60 to 70° C. and the temperature maintained at about 70° C. for about one hour and the volatile by-products are then removed at about 70° C. and about 12 mm. Hg.

General method for A5 to A12 (Table 3)

The phosphorous acid and alkylene oxide are added dropwise simultaneously from separate vessels, into the carboxylic acid, and some more alkylene oxide may then be added dropwise at about 70° C. and the temperature maintained at about 70° C. for about one hour and the reaction mixture then degasified at about 70° C. and 12 mm. Hg.

A13

About 100 parts by weight of 82% phosphorous acid and about 180 parts of propylene oxide are added dropwise simultaneously into about 300 parts of tall oil fatty acid at about 60 to 70° C. A further about 240 parts of propylene oxide are then added dropwise at about 60 to 70° C. and about 150 parts of bromide at about 50° C. About 970 parts yield with 8.8% OH is obtained; viscosity about 118 cp./25°; 17.7% bromine and 2.9% phosphorous.

TABLE 2

| | Phosphorous Acid | | Fatty Acid | Alkylene Oxide | Yield | Percent OH | Viscosity cp./25° | Percent P |
|---|---|---|---|---|---|---|---|---|
| | Pts. by wt. | Percent | | | | | | |
| A1 | 100 | 82 | 282 oleic acid | 464 propylene oxide | 816 | 10.5 | 69 | 3.65 |
| A2 | 100 | 82 | 144 2-ethylhexanic acid | 364 propylene oxide | 600 | 14.0 | 73 | 5.3 |
| A3 | 100 | 82 | 300 dist. train oil fatty acid | 464 propylene oxide | 810 | 10.6 | 70 | |
| A4 | 100 | 82 | 300 dist. tall oil fatty acid | do | 800 | 10.6 | 92 | 3.2 |

TABLE 3

| Fatty acid | Phosphorous acid Pts. by wt. | Phosphorous acid Percent | Alkylene oxide | After-treatment | Yield | Percent OH | Viscosity, cp./25° | Percent |
|---|---|---|---|---|---|---|---|---|
| A5____ 600 dist. tall oil fatty acid_____ | 200 | 82 | 470 propylene oxide___ | 180 propylene oxide___ | 1,454 | 11.8 | 115 | 3 |
| A6____ 1,200 dist. tall oil fatty acid___ | 400 | 82 | 960 propylene oxide___ | 480 propylene oxide___ | 3,028 | 11.2 | 119 | 4 |
| A7____ 1,200 dist. train oil fatty acid__ | 400 | 82 | _____do_____ | 740 propylene oxide___ | 3,289 | 10.3 | 77 | 3 |
| A8____ 300 dist. tall oil fatty acid_____ | 100 | 82 | 140 1-buteneoxide____ | 280 1-butene oxide____ | 820 | 10.4 | 98 | 3 |
| A9_____do_____ | 100 | 82 | 184 epichlorohydrin___ | 370 epichlorohydrin___ | 935 | 9.0 | 341 | 3, 22 |
| A10_____do_____ | 100 | 82 | {116 propylene oxide___ 120 styrene oxide_____} | 180 propylene oxide___ | 814 | 10.4 | 159 | 3 |
| A11_____do_____ | 33 | 82 | 120 propylene oxide___ | 60 propylene oxide____ | 454 | 8.6 | 210 | 2 |
| A12_____do_____ | 300 | 82 | 480 propylene oxide___ | 480 propylene oxide___ | 1,547 | 14.3 | 3,020 | 5 |

A14

About 300 parts of 82% phosphorous acid, about 98 parts of maleic acid anhydride and about 240 parts of propylene oxide are added dropwise at about 60 to 70° C. into about 300 parts of tall oil fatty acid. A further about 900 parts of propylene oxide are then added at about 70° C. About 1827 parts of adduct are obtained: viscosity about 200 cp./25°; 12.0% OH; 5.3% P.

A15

About 7 parts of water and then about 300 parts of tall oil fatty acid are added dropwise, both at about 60° C., into about 75 parts of a commercial phosphorous acid (containing 41.3% P, i.e., pyrophosphorous acid components). About 220 parts of propylene oxide are then added at about 60 to 70° C. About 591 parts of adduct are obtained; viscosity about 122 cp./25°; 8.5% OH; 5.0% P.

The invention is further illustrated by the following examples in which parts are by weight unless otherwise specified.

Example 1

About 50.0 parts A1 are thoroughly stirred with about 50.0 parts of a polyester of adipic acid, phthalic acid anhydride, oleic acid and trimethylolpropane (OH number 380), about 2.0 parts of permethylated amino ethyl piperazine, about 0.3 parts polysiloxane polyalkylene glycol ester and about 6.0 parts of sodium castor oil sulphate (50% water). After the addition of about 134.0 parts of 4,4'-diphenylmethane diisocyanate (90%) the mixture begins to foam and a difficultly inflammable foam plastic having the following physical properties is obtained:

Weight per unit volume _____kg./m.$^3$__ 50
Resistance to compression _____kp./cm.$^2$__ 3.0
Impact strength _____cm. kp./cm.$^2$__ 0.7
Resistance to bending under heat _____°C__ 118
Water uptake _____volumes percent__ 5.6

Example 2

About 50.0 parts of A2 are thoroughly mixed with about 20.0 parts of propoxylated trimethylolpropane (OH number 380), about 30.0 parts of propoxylated ethylene diamine (OH number 450), about 0.5 part of polysiloxane polyalkylene glycol ester and about 2.0 parts of sodium caster oil sulphate (50% water). After the addition of a solution of about 30.0 parts of trichlorofluoromethane in about 125.0 parts of 4,4'diphenylmethane diisocyanate (90%), a difficultly inflammable hard foam plastic is obtained which has the following properties:

Weight per unit volume _____kg./m.$^3$__ 27
Resistance to compression _____kp./cm.$^2$__ 1.8
Impact strength _____cm. kp./cm.$^2$__ 0.4
Resistance to bending under heat _____°C___ 114
Water uptake _____volumes percent__ 1.0

Example 3

About 50.0 parts of A3 are throughly stirred with about 50.0 parts of a polyester of adipic acid, phthalic acid anhydride, oleic acid and trimethylolpropane (OH number 380), about 20.0 parts of propoxylated ethylene diamine (OH number about 450), about 3.0 parts of N-ethylmorpholine, about 0.5 part of polysiloxanepolyalkylene glycol ester and about 2.0 parts of sodium castor oil sulphate (50% water).

After the addition of a solution of about 30.0 parts of trichlorofluoromethane in about 106.0 parts of 4,4'-diphenylmethane diisocyanate (90%) a difficultly inflammable foam plastic is obtained which has the following mechanical properties:

Weight per unit volume _____kg./m.$^3$__ 30
Resistance to compression _____kp./cm.$^2$__ 1.5
Impact strength _____cm. kp./cm.$^2$__ 0.5
Resistance to bending under heat _____°C__ 114
Water uptake _____volume percent__ 2.6

Example 4

About 50.0 parts of A4 are thoroughly mixed with about 30.0 parts of a polyester of adipic acid, phthalic acid anhydride, oleic acid and trimethylolpropane (OH number 380), about 20.0 parts of propoxylated ethylene diamine (OH number 450), about 0.3 part of polysiloxane polyalkylene glycol ester and about 6.0 parts of sodium castor oil sulphate (50% water). After the addition of about 137.0 parts of 4,4'-diphenylmetahne diisocyanate (90%) a difficulty inflammable foam plastic is obtained which has the following physical properties:

Weight per unit volume _____kg./m.$^3$ 41
Resistance to compression _____kp./cm.$^2$__ 2.8
Impact strength _____cm. kp./cm.$^2$__ 0.5
Resistance to bending under heat _____°C__ 145
Water uptake _____volume percent__ 4.1

Example 5

About 30.0 parts of A5 are thoroughly stirred with about 40.0 parts of a polyester of adipic acid, phthalic acid anhydride, oleic acid and trimethylolpropane (OH number 380), about 30.0 parts of propoxylated ethylene diamine (OH number 450), about 0.3 part of polysiloxane polyalkylene glycol ester and about 6.0 parts of sodium castor oil sulphate (50% water). After the addition of about 143.0 parts of 4,4'-diphenylmethane diisocyanate (90%), a finely porous, difficultly inflammable hard foam plastic is obtained which has the following physical properties:

Weight per unit volume _____kg./m.$^3$__ 38
Resistance to compression _____kp./cm.$^2$__ 2.2
Impact strength _____cm. kp/cm.$^2$__ 0.4
Resistance to bending under heat _____°C__ 163
Water uptake _____volume percent__ 1.6

Example 6

About 50.0 parts of A6 are thoroughly stirred with about 20.0 parts of a polyester of adipic acid, phthalic acid anhydride, oleic acid and trimethylolpropane (OH number 380), about 30.0 parts of propoxylated ethylene diamine (OH number 450), about 0.5 part of polysiloxane polyalkylene glycol ester and about 2.0 parts of sodium castor oil sulphate (50% water). After the addition of a mixture of about 30.0 parts of trichlorofluoromethane in about 110.0 parts of 4,4'-diphenylmethane diisocyanate (90%) a finely porous, flame-resistant foam plastic having the following mechanical properties is obtained:

Weight per unit volume _____kg./m.$^3$__ 26
Resistance to compression _____kp./cm.$^2$__ 1.4
Impact strength _____cm. kp./cm.$^2$__ 0.3
Resistance to bending under heat _____° C__ 116
Water uptake _____volume percent__ 2.4

Example 7

About 50.0 parts of A7 are thoroughly mixed with about 20.0 parts of a polyester of adipic acid, phthalic acid anhydride, oleic acid and trimethylolpropane (OH number 380), about 30.0 parts of propoxylated ethylene diamine (OH number 450), about 0.3 part of polysiloxane polyalkylene glycol ester and about 6.0 parts of sodium castor oil sulphate (50% water). After the addition of 138.0 parts of 4,4'-diphenylmethane diisocyanate (90%) a flame-resistant foam plastic is obtained which has the following physical properties:

Weight per unit volume _____kg./m.$^3$__ 46
Resistance to compression _____kp./cm.$^2$ 3.3
Impact strength _____cm. kp./cm.$^2$ 0.4
Resistance to bending under heat _____° C__ 125
Water uptake _____volume percent__ 3.7

Example 8

About 30.0 parts of A8 are thoroughly mixed with about 40.0 parts of a propoxylated trimethylolpropane (OH number 380), about 30.0 parts of propoxylated ethylenediamine (OH number 450), about 0.3 part of polysiloxane polyalkylene glycol ester and about 6.0 parts of sodium castor oil sulphate (50% water). After stirring about 140.0 parts of 4,4'-diphenylmethane diisocyanate (90%) into the mixture, a difficultly inflammable hard foam plastic is obtained which has the following physical properties:

Weight per unit volume _____kg./m.$^3$ 46
Resistance to compression _____kp./cm.$^2$ 3.6
Impact strength _____cm. kp./cm.$^2$__ 0.6
Resistance to bending under heat _____° C__ 140
Water uptake _____volume percent__ 3.3

Example 9

About 50.0 parts by weight of A10 are thoroughly stirred with about 30.0 parts of a polyester of adipic acid, phthalic acid anhydride, oleic acid and trimethylolpropane (OH number 380), about 20.0 parts by weight of propoxylated ethylene diamine (OH number 450), about 0.3 part of polysiloxane polyalkylene glycol ester and about 6.0 parts of sodium castor oil sulphate (50% water). After the addition of about 136.0 parts of 4,4'-diphenylmethane diisocyanate (90%) a flame resistant hard foam plastic having the following mechanical properties is obtained:

Weight per unit volume _____kg./m.$^3$__ 43
Resistance to compression _____kp./cm.$^2$__ 3.2
Impact strength _____cm. kp./cm.$^2$__ 0.3
Resistance to bending under heat _____° C__ 156
Water uptake _____volume percent__ 0.8

Example 10

About 50.0 parts of A11 are thoroughly stirred with about 50.0 parts of a polyester of adipic acid, phthalic acid anhydride, oleic acid and trimethylolpropane (OH number 380), about 3.0 parts of permethylated amino ethyl piperazine, about 0.3 part of polysiloxane polyalkylene glycol ester and about 6.0 parts of sodium castor oil sulphate (50% water). After the addition of about 126.0 parts of 4,4'-diphenylmethane diisocyanate (90%) a finely porous hard foam plastic is obtained which has the following physical properties:

Weight per unit volume _____kg./m.$^3$__ 41
Resistance to compression _____kp./cm.$^2$__ 2.5
Impact strength _____cm. kp./cm.$^2$__ 0.3
Resistance to bending under heat _____° C__ 125
Water uptake _____volume percent__ 3.4

Example 11

About 30.0 parts of A12 are thoroughly mixed with about 40.0 parts of a polyester of adipic acid, phthalic acid anhydride, oleic acid and trimethylolpropane (OH number 380), about 30.0 parts of propoxylated ethylene diamine (OH number 450), about 0.3 part of polysiloxane polyalkylene glycol ester and about 6.0 parts of sodium castor oil sulphate (50% water). After the addition of about 149.0 parts of 4,4'-diphenylmethane diisocyanate (90%) a finely porous, difficultly inflammable hard foam plastic is obtained which has the following physical properties:

Weight per unit volume _____kg./m.$^3$__ 42
Resistance to compression _____kp./cm.$^2$__ 3.4
Impact strength _____cm. kp./cm.$^2$__ 0.4
Resistance to bending under heat _____° C__ 159
Water uptake _____volume percent__ 2.0

The phosphorous acid is supplied at the given concentration under nitrogen, the alpha, beta-unsaturated dicarboxylic acid or anhydride is added in about two hours at about 60° C. and the alkylene oxide is added dropwise at about 60 to 70° C. at a rate depending on the exothermic reaction. The reaction mixture is then heated for about one hour at about 70° C. and the volatile constituents are then removed at about 70° C. at 12 mm. Hg.

Example 12

50.0 parts by weight of A13 are thoroughly mixed with 20.0 parts by weight of propoxylated trimethylol propane (OH number 380), 30.0 parts by weight of propoxylated ethylene diamine (OH number 450) 0.3 part by weight of polysiloxane polyalkylene glycol ester and 6.0 parts by weight of sodium castor oil sulphate (50% water). After the addition of 147.0 parts by weight of 4,4'-diphenyl methane diisocyanate (90%) a flame-resistant foam is obtained which has the following physical properties:

Weight per unit volume _____kg./m.$^3$__ 47
Resistance to compression _____kp./cm.$^2$__ 3.3
Impact strength _____cm. kp./cm.$^2$__ 0.4
Resistance to bending under heat _____° C__ 137
Water uptake _____volume percent__ 2.8

Example 13

30.0 parts by weight of A14 are thoroughly mixed with 40.4 parts by weight of propoxylated trimethylol propane (OH number 380), 30.0 parts by weight of propoxylated ethylene diamine (OH number 450), 0.3 part by weight of polysiloxane polyalkylene glycol ester and 6.0 parts by weight of sodium castor oil sulphate (50% water).

After admixture of 143.0 parts by weight of 4,4'-diphenyl methane diisocyanate (90%) a flame-resistant foam is obtained which has the following physical properties:

Weight per unit volume _____ kg./m.$^3$__ 44
Resistance to compression _____ kp./cm.$^2$__ 3.4
Impact strength _____ cm. kp./cm.$^2$__ 0.6
Resistance to bending under heat _____ ° C__ 149
Water uptake _____ volume percent__ 2.7

TABLE 4

| | Phosphorous Acid | | Carboxylic Acid | Alkylene Oxide | Yield | Percent OH | Viscosity, cp./25° | Percent P |
|---|---|---|---|---|---|---|---|---|
| | Pts. by wt. | Percent | | | | | | |
| A16 | 117 | 70 | 98 maleic acid anhydride | 400 propylene oxide | 603 | 17.0 | 690 | 5.75 |
| A17 | 117 | 70 | ....do | 262 propylene oxide | 460 | 22.2 | 1,840 | 7.1 |
| A18 | 117 | 70 | ....do | 510 propylene oxide | 716 | 14.3 | 425 | 4.0 |
| A19 | 200 | 82 | 196 maleic acid anhydride | 1,067 propylene oxide | 1,223 | 11.1 | 750 | 4.6 |
| A20 | 100 | 82 | 116 fumaric acid | 464 propylene oxide | 640 | 16.0 | 370 | 5.3 |
| A21 | 100 | 82 | 130 itaconic acid | 464 propylene oxide | 682 | 15.0 | 600 | 4.1 |

TABLE 5

| | Phosphorous Acid | | 1st part alkylene oxide | Carboxylic Acid | 2nd part alkylene oxide | Yield | Percent OH | Viscosity, cp./25° | Percen P |
|---|---|---|---|---|---|---|---|---|---|
| | Pts. by wt. | Percent | | | | | | | |
| A22 | 200 | 82 | 350 propylene oxide | 196 maleic acid anhydride | 350 propylene oxide | 1,059 | 12.8 | 1,400 | 5.6 |
| A23 | 200 | 82 | 120 propylene oxide | ....do | 600 propylene oxide | 1,115 | 12.2 | 1,050 | 5.0 |
| A24 | 200 | 82 | 60 propylene oxide | ....do | 660 propylene xodie | 1,104 | 12.2 | 1,150 | 5.3 |
| A25 | 100 | 82 | 120 propylene oxide | 98 maleic acid anhydride | {93 epichloropyrin / 180 propylene oxide} | 586 | 11.6 | 1,720 | {5.0 / *6.3} |
| A26 | 100 | 82 | 70 1-butene oxide | ....do | 420 1-buteneoxide | 628 | 10.0 | 690 | 4.0 |
| A27 | 100 | 82 | 180 propylene oxide | 33 maleic acid anhydride | 180 propylene oxide | 491 | 13.8 | 245 | |
| A28 | 100 | 82 | ....do | 198 maleic acid anhydride | 240 propylene oxide | 676 | 10.0 | 7,630 | |

*Percent Cl.

Example 14

50.0 parts by weight of A15 are thoroughly mixed with 20.0 parts by weight of a polyester prepared from adipic acid, phthalic acid anhydride, oleic acid and trimethylol propane (OH number 380), 30.0 parts by weight of propoxylated ethylene diamine (OH number 450), 2.0 parts by weight of ethyl morpholine, 0.5 part by weight of polysiloxane polyalkylene glycol ester and 2.0 parts by weight of sodium castor oil sulphate (50% water).

After the addition of a solution of 30.0 parts by weight of trichloro fluoro methane in 99.0 parts by weight of 4,4'-diphenylmethane diisocyanate (90%) a rigid foam which has fine pores and is highly inflammable is obtained having the following physical properties:

Weight per unit volume _____ kg./m.$^3$__ 37
Resistance to compression _____ kp./cm.$^2$__ 2.1
Impact strength _____ cm. kp./cm.$^2$__ 0.4
Resistance to bending under heat _____ ° C__ 123
Water uptake _____ volume percent__ 2.8

An entirely different set of phosphorous containing polyols is prepared for use in Examples 12 to 31. Products A16 to A35 disclosed below are employed in Examples 15 to 31. The preparation of products A16 to A21 is shown in Table 4 and the preparation of A22 to A28 is shown in Table 5 wherein an alkylene oxide is first added dropwise under nitrogen into the aqueous phosphorous acid prepared, and the alpha, beta-unsaturated carboxylic acid or its anhydride is then added in about two hours and more alkylene oxide is added dropwise.

A29

About 100 parts of 82% phosphorous acid are heated to about 60° C. and about 60 parts of propylene oxide are added dropwise at this temperature. About 98 parts of maleic acid anhydride are then introduced over one hour and (a) about 100 parts of 82% phosphorous acid, (b) about 98 parts of molten maleic acid anhydride and (c) about 180 parts of propylene oxide are then added dropwise through separate dropping funnels five times at about 60 to 70° C. A further about 500 parts of propylene oxide are then added, the temperature kept at about 70° C. for about one hour and the volatile constituents removed by degasification at about 70° C. and 12 mm. Hg. About 2602 parts of adduct with about 15.7% OH; viscosity 3300 cp./25°; 6.9% phosphorous.

A30

As in A29, about 100 parts of 82% phosphorous acid, about 240 parts of propylene oxide and about 98 parts of maleic acid anhydride are first reacted together. And then, by the method described in A29, about 98 parts of molten maleic acid anhydride, about 100 parts of 82% phosphorous acid and about 240 parts of propylene oxide are each added four times. Finally a further about 600 part of propylene oxide are added. About 2752 parts of adduct, viscosity 1390 cp./25°, 12.2% OH, 6.0% phosphorous.

A31

As in A29, about 100 parts of 82% phosphorous acid, about 180 parts of propylene oxide, about 98 parts of maleic acid anhydride are first reacted together and then (a) about 98 parts of molten maleic acid anhydride, (b) about 100 parts of 82% phosphorous acid and (c) about 180 parts of propylene oxide are each added four times and finally about 900 parts of propylene oxide are added. About 2730 parts of adduct, viscosity 1330 cp./25°, 12.3% OH, 5.6% P.

A32

About 100 parts of 82% phosphorous acid are first reacted with about 60 parts of propylene oxide and about 98 parts of maleic acid anhydride and then about 300 parts of propylene oxide are added in the usual manner and then about 120 parts of bromine are added at about 60° C. About 674 parts of a bromine-containing polyhydroxyl compound are obtained. Percent OH 10.0, 4.7% P, 17.6% Br., viscosity 10320 cp./25°.

A33

About 120 parts of propylene oxide are first added dropwise under nitrogen to about 100 parts of 82% phosphorous acid at about 60 to 70° C., about 49 parts of maleic acid anhydride are introduced and then about 200 parts of 82% phosphorus acid, about 240 parts of propylene oxide and about 98 parts of maleic acid anhydride are simultaneously added dropwise. About 720 parts of propylene oxide are then added. After working up, about 1493 parts of a colorless ester with 13.6% OH, 6.6% phosphorous and a viscosity of 423 cp./25° are obtained.

A34

About 75 parts of commercial phosphorous acid (41.3% P, thus containing pyrophosphorous acid) are treated at about 60° C. with about 7 parts of water and then about 120 parts of propylene oxide and about 98 parts of maleic acid anhydride are simultaneously added dropwise. About 240 parts of propylene oxide are then added. About 529 parts of an adduct containing 6.3% OH, 6.95% phosphorous and having a viscosity of 8300 cp./25° are obtained.

A35

Similarly to A34, about 25 parts of water are added to about 75 parts of the phosphorous acid indicated there and the method is then continued as described below. About 550 parts of a polyester containing 12.2% OH, 5.6% phosphorous and having a viscosity of 132 cp./25° are obtained.

Example 15

About 30.0 parts of A16 are thoroughly stirred with about 30.0 parts of a polyester of adipic acid, phthalic acid anhydride, oleic acid and trimethylolpropane (hydroxyl number 380), about 40.0 parts of propoxylated ethylene diamine (hydroxyl number 450), about 0.5 part of polysiloxane polyalkylene glycol ester and about 2.0 parts of sodium castor oil sulphate (50% water). After the addition of a solution of about 30.0 parts of trichlorofluoromethane in about 131.0 parts of 4,4'-diphenylmethane diisocyanate (90%) the mixture begins to foam and a difficultly inflammable hard foam plastic having the following physical properties is obtained:

Weight per unit volume _____kg./m³__ 34
Resistance to compression _____kg./cm.²__ 2.1
Impact strength _____kg./cm__ 0.3
Resistance to bending under heat _____° C__ 145
Water uptake _____volume percent__ 2.7

Example 16

About 30.0 parts of A17 are thoroughly mixed with about 70.0 parts of a polyester of adipic acid, phthalic acid anhydride, oleic acid and trimethylolpropane (hydroxyl number 380), about 2.0 parts of permethylated amino ethyl piperazine, about 0.3 part of polysiloxane polyalkylene glycol ester and about 6.0 parts of sodium castor oil sulphate (50% water). After stirring about 163.0 parts of 4,4'-diphenylmethane diisocyanate (90%) into the mixture, a flame resistant hard foam plastic having the following properties is obtained:

Weight per unit volume _____kg./m.³__ 31
Resistance to compression _____kg./cm.²__ 1.7
Impact strength _____kg./cm__ 0.2
Resistance to bending under heat _____° C__ 148
Water uptake _____volume percent__ 3.5

Example 17

About 30.0 part of A18 are thoroughly mixed with about 40.0 parts of a polyester of adipic acid, phthalic acid anhydride, oleic acid and trimethylolpropane (hydroxyl number 380), about 30.0 parts of propoxylated ethylene diamine (OH number 380), about 2.0 parts of ethyl morpholine, about 0.5 part of polysiloxane polyalkylene glycol ester and about 2.0 parts of sodium castor oil sulphate (50% water). After the addition of a solution of about 40.0 parts of trichlorofluoromethane in about 119.0 parts of 4,4'-diphenylmethane diisocyanate (90%) a difficultly inflammable foam plastic having the following physical properties is obtained:

Weight per unit volume _____kg./m.³__ 24
Resistance to compression _____kg./cm.²__ 1.6
Impact strength _____kg./cm__ 0.2
Resistance to bending under heat _____° C__ 126
Water uptake _____volume percent__ 3.2

Example 18

About 30.0 parts of A19 are thoroughly stirred with about 40.0 parts of propoxylated trimethylolpropane (hydroxyl number 380), about 30.0 parts of propoxylated ethylene diamine (hydroxyl number 450), about 0.3 part of polysiloxane polyalkylene glycol ester and about 6.0 parts of sodium castor oil sulphate (50% water). After adding about 142.0 parts of 4,4'-diphenylmethane diisocyanate (90%) a flame-resistant hard foam plastic is obtained which has the following mechanical properties:

Weight per unit volume _____kg./m.³__ 43
Resistance to compression _____kg./cm.²__ 3.2
Impact strength _____kg./cm__ 0.6
Resistance to bending under heat _____° C__ 142
Water uptake _____volume percent__ 3.9

Example 19

About 50.0 parts of A20 are thoroughly mixed with about 20.0 parts of propoxylated trimethylolpropane (hydroxyl number 380), about 30.0 parts of propoxylated ethylene diamine (OH number 450), about 2.0 parts of dimethylbenzylamine, about 0.5 part of polysiloxane polyalkylene glycol ester and about 2.0 parts of sodium castor oil sulphate (50% water). After stirring in about 128.0 parts of 4,4'-diphenylmethane diisocyanate (90%), a difficultly inflammable foam plastic is obtained which has the following physical properties:

Weight per unit volume _____kg./m.³__ 26
Resistance to compression _____kg./cm.²__ 1.6
Impact strength _____kg./cm__ 0.4
Resistance to bending under heat _____° C__ 127
Water uptake _____volume percent__ 1.6

Example 20

About 50.0 parts of A22 are thoroughly mixed with about 50.0 parts of a polyester of adipic acid, phthalic acid anhydride, oleic acid and trimethylolpropane (hydroxyl number 380), about 2.0 parts of permethylated aminoethyl piperazine, about 0.3 part of polysiloxane polyalkylene glycol ester and about 6.0 parts of sodium castor oil sulphate (50% water). After stirring in about 144.0 parts of 4,4'-diphenylmethane diisocyanate (90%), a difficultly inflammable foam plastic with the following properties is obtained:

Weight per unit volume _____kg./m.³__ 31
Resistance to compression _____kg./cm.²__ 2.0
Impact strength _____kg./cm__ 0.4
Resistance to bending under heat _____° C__ 148
Water uptake _____volume percent__ 3.7

Example 21

About 30.0 parts of A23 are thoroughly mixed with about 40.0 parts of propoxylated trimethylolpropane (hydroxyl number 380), about 30.0 parts of propoxylated ethylene diamine (hydroxyl number 450), about 3.0 parts of methyl morpholine, about 0.5 part of polysiloxane polyalkylene glycol ester and about 2.0 parts of sodium castor oil sulphate (50% water). After the addition of a solution of about 30.0 parts of trichlorofluoromethane in about 130.0 parts of 4,4'-diphenylmethane diisocyanate (90%), a difficulty inflammable foam plastic having the following physical properties is obtained:

Weight per unit volume _____kg./m.$^3$__ 35
Resistance to compression _____kg./cm.$^2$__ 2.4
Impact strength _____kg./cm__ 0.7
Resistance to bending under heat _____° C__ 112
Water uptake _____volume percent__ 2.4

Example 22

About 30.0 parts of A24 are thoroughly stirred with about 40.0 parts of propoxylated trimethylolpropane (OH number 380), about 30.0 parts of propoxylated ethylene diamine (hydroxyl number 450), about 1.5 parts of permethylated aminoethylpiperazine, about 0.5 part of polysiloxane polyalkylene glycol ester and about 2.0 parts of sodium castor oil sulphate (50% water). After adding a solution of about 30.0 parts of trichlorofluoromethane in about 113.0 parts of 4,4'-diphenylmethane diisocyanate (90%) to the mixture, a flammable resistant foam plastic having the following mechanical properties is obtained:

Weight per unit volume _____kg./m.$^3$__ 31
Resistance to compression _____kg./cm.$^2$__ 2.3
Impact strength _____kg./cm__ 0.6
Resistance to bending under heat _____° C__ 113
Water uptake _____volume percent__ 2.3

Example 23

About 50.0 parts of A21 are thoroughly mixed with about 20.0 parts of a propoxylated trimethylolpropane (hydroxyl number 380), about 30.0 parts of propoxylated ethylene diamine (hydroxyl number 450), about 1.0 parts of permethylated aminoethylpiperazine, about 0.5 part of polysiloxane polyalkylene glycol ester and about 2.0 parts of sodium castor oil sulphate (50% water). After the addition of a solution of about 30.0 parts of trichlorofluoromethane in about 115.0 parts of 4,4'-diphenylmethane diisocyanate (90%) a finely porous difficultly inflammable hard foam plastic having the following physical properties is obtained:

Weight per unit volume _____kg./m.$^3$__ 30
Resistance to compression _____kp./cm.$^2$__ 2.1
Impact strength _____cm. kp./cm.$^2$__ 0.4
Resistance to bending under heat _____° C__ 128
Water uptake _____volume percent__ 1.2

Example 24

About 30.0 parts of A25 are thoroughly stirred with about 40.0 parts of a polyester of adipic acid, phthalic acid anhydride, oleic acid and trimethylolpropane (hydroxyl number 380), about 30.0 parts of propoxylated ethylene diamine (hydroxyl number 450), about 0.3 part of polysiloxane polyalkylene glycol ester and about 6.0 parts of sodium castor oil sulphate (50% water).

After adding about 143.0 parts of 4,4'-diphenylmethane diisocyanate (90%), a difficultly inflammable foam plastic having the following physical properties is obtained:

Weight per unit volume _____kg./m.$^3$__ 46
Resistance to compression _____kp./cm.$^2$__ 4.2
Impact strength _____cm. kp./cm.$^2$__ 0.4
Resistance to bending under heat _____° C__ 162
Water untake _____volume percent__ 1.5

Example 25

About 50.0 parts of A26 are thoroughly mixed with about 20.0 parts of a polyether of propoxylated trimethylolpropane (hydroxyl number 380), about 30.0 parts of propoxylated ethylene diamine (hydroxyl number 450), about 1.0 parts of ethyl morpholine, about 0.5 part of polysiloxane polyalkylene glycol ester and about 2.0 parts of sodium castor oil sulphate (50% water). After the addition of a solution of about 30.0 parts of trichlorofluoromethane in about 105.0 parts of 4,4'-diphenylmethane diisocyanate (90%) a difficultly inflammable hard foam plastic having the following mechanical properties is obtained:

Weight per unit volume _____kg./m.$^3$__ 29
Resistance to compression _____kp./cm.$^2$__ 2.0
Impact strength _____cm. kp./cm.$^2$__ 0.5
Resistance to bending under heat _____° C__ 111
Water uptake _____volume percent__ 1.9

Example 26

About 30.0 parts of A27 are thoroughly stirred with about 40.0 parts of a polyether of propoxylated trimethylolpropane (hydroxyl number 380), about 30.0 parts of propoxylated ethylene diamine (hydroxyl number 450), about 0.3 part of polysiloxane polyalkylene glycol ester and about 6.0 parts of sodium castor oil sulphate (50% water). After the addition of about 145.0 parts of 4,4'-diphenylmethane diisocyanate (90%), a flame resistant hard foam plastic is obtained which has the following mechanical properties:

Weight per unit volume _____kg./m.$^3$__ 48
Resistance to compression _____kp./cm.$^2$__ 3.7
Impact strength _____cm. kp./cm.$^2$__ 0.8
Resistance to bending under heat _____° C__ 150
Water uptake _____volume percent__ 2.3

Example 27

About 30.0 parts of A28 are thoroughly mixed with about 40.0 parts of a polyether of propoxylated trimethylolpropane (hydroxyl number 380), about 30.0 parts of propoxylated ethylene diamine (hydroxyl number 450), about 0.3 part of polysiloxane polyalkylene glycol ester and about 6.0 parts of sodium castor oil sulphate (50% water). After mixing about 139 parts of 4,4'-diphenylmethane diisocyanate (90%) into the above, a difficultly inflammable, finely porous hard foam plastic having the following physical properties is obtained:

Weight per unit volume _____kg./m.$^3$__ 48
Resistance to compression _____kp./cm.$^2$__ 4.2
Impact strength _____cm. kp./cm.$^2$__ 0.7
Resistance to bending under heat _____° C__ 153
Water uptake _____volume percent__ 0.3

Example 28

About 30 parts of A29 are thoroughly mixed with about 40 parts of propoxylated trimethylolpropane (hydroxyl number 380), about 30 parts of propoxylated ethylene diamine (OH number 450), about 0.3 part of polysiloxane polyalkylene glycol ester and about 6 parts of sodium castor oil sulphate (50% water). After the addition of about 152 parts of 4,4'-diphenylmethane diisocyanate (90%), a flame resistant hard foam plastic having the following physical properties is obtained:

Weight per unit volume _____kg./m.$^3$__ 41
Resistance to compression _____kg./cm.$^2$__ 3.5
Impact strength _____kg./cm__ 0.3
Resistance to bending under heat _____° C__ 172
Water uptake _____volume percent__ 0.2

Example 29

About 50 parts of A30 are thoroughly stirred with about 50 parts of propoxylated ethylene diamine (hydroxyl number 450), about 0.3 part of polysiloxane polyalkylene glycol ester and about 6 parts of sodium castor oil sulphate (50% water). After the addition of about 148 parts of 4,4'-diphenylmethane diisocyanate (90%) a difficulty inflammable hard foam plastic having the following mechanical properties is obtained:

Weight per unit volume _____kg./m.$^3$__ 52
Resistance to compression _____kg./cm.$^2$__ 4.4
Impact strength _____kg./cm__ 0.4
Resistance to bending under heat _____° C__ 164
Water uptake _____volume percent__ 0.4

Example 30

About 30 parts of A31 are thoroughly stirred with about 40 parts of a polyester of adipic acid, phthalic acid anhydride, oleic acid and trimethylolpropane (OH number 380), about 30 parts of propoxylated ethylene diamine (OH number 450), about 0.5 part of polysiloxane polyalkylene glycol ester and about 2 parts of sodium castor oil sulphate (50% water). After mixing into the above a solution of about 30 parts of trichlorofluoromethane in about 114 parts of 4,4'-diphenylmethane diisocyanate (90%), a flame resistant hard foam plastic having the following physical properties is obtained:

| | | |
|---|---|---|
| Weight per unit volume | kg./m.³ | 30 |
| Resistance to compression | kg./cm.² | 1.9 |
| Impact strength | kg./cm. | 0.2 |
| Resistance to bending under heat | ° C. | 132 |
| Water uptake | volume percent | 3 |

Example 31

About 30 parts of A32 are thoroughly mixed with about 40 parts of propoxylated trimethylolpropane (OH number 380), about 30 parts of propoxylated ethylene diamine (hydroxyl number 450), about 2 parts of methyl morpholine about 0.5 part of polysiloxane polyalkylene glycol ester and about 2 parts of sodium castor oil sulphate (50% water). After the addition of a solution of about 30 parts of trichlorofluoromethane in about 108 parts of 4,4' - diphenylmethane diisocyanate (90%) a flame resistant hard foam plastic having the following mechanical properties is obtained:

| | | |
|---|---|---|
| Weight per unit volume | kg./m.³ | 27 |
| Resistance to compression | kg./cm.² | 1.5 |
| Impact strength | kg./cm. | 0.3 |
| Resistance to bending under heat | ° C. | 118 |
| Water uptake | volume percent | 2.2 |

The polysiloxane polyalkylene glycol ester employed in the foregoing working examples has the formula

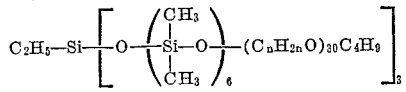

wherein $(C_nH_{2n}O)$ is a mixed polyoxyethylene and oxypropylene block copolymer containing about 17 oxyethylene units and about 13 oxypropylene units. Also, the 4,4'-diphenylmethane diisocyanate (90%) employed in the foregoing working examples is a mixture of isocyanates obtained by phosgenating the reaction product of aniline with formaldehyde which contains about 90% 4,4'-diphenylmethane diamine.

Example 32

30.0 parts by weight of A33 are thoroughly mixed with 40.0 parts by weight of a polyester prepared from adipic acid, phthalic acid anhydride, oleic acid and trimethylol propane (OH number 380), 30.0 parts by weight of propoxylated ethylene diamine (OH number 450), 2.0 parts by weight of ethyl morpholine, 0.5 part by weight of polysiloxane polyalkylene glycol ester and 2.0 parts by weight of sodium castor oil sulphate (50% water).

After addition of a solution of 30.0 parts by weight of trichloro fluoro methane in 117.0 parts by weight of 4,4'-diphenylmethane diisocyanate (90%) a flame-resistant rigid foam with the following mechanical properties is obtained:

| | | |
|---|---|---|
| Weight per unit volume | kg./m.³ | 29 |
| Resistance to compression | kp./cm.² | 2.1 |
| Impact strength | cm. kp./cm.² | 0.3 |
| Resistance to bending under heat | ° C. | 137 |
| Water uptake | volume percent | 3.2 |

Example 33

30.0 parts by weight of A34 are thoroughly mixed with 40.0 parts by weight of propoxylated trimethylol propane (OH number 380), 30.0 parts by weight of propoxylated ethylene diamine (OH number 450), 0.3 part by weight of polysiloxane polyalkylene glycol ester and 6.0 parts by weight of sodium castor oil sulphate (90 percent).

After addition of 134.0 parts by weight of 4,4'-diphenylmethane diisocyanate (90%) a finely porous difficultly inflammable hard foam plastic with the following physical properties is obtained:

| | | |
|---|---|---|
| Weight per unit volume | kg./m.³ | 47 |
| Resistance to compression | kp./cm.² | 2.8 |
| Impact strength | cm. kp./cm.² | 0.3 |
| Resistance to bending under heat | ° C. | 127 |
| Water uptake | volume percent | 2.5 |

Example 34

30.0 parts by weight of A35 are thoroughly mixed with 40.0 parts by weight of propoxylated trimethylol propane (OH number 380), 30.0 parts by weight of propoxylated ethylene diamine (OH number 450), 0.5 part by weight of polysiloxane polyalkylene glycol ester and 2.0 parts by weight of sodium castor oil sulphate (50% water).

After addition of a solution of 30.0 parts by weight of trichloro fluoro methane in 113.0 parts by weight of 4,4'-diphenylmethane diisocyanate (90%) a difficultly inflammable hard foam plastic with the following physical properties is obtained:

| | | |
|---|---|---|
| Weight per unit volume | kg./m.³ | 33 |
| Resistance to compression | kp./cm.² | 1.9 |
| Impact strength | cm. kp./cm.² | 0.4 |
| Resistance to bending under heat | ° C. | 128 |
| Water uptake | volume percent | 2.7 |

It is to be understood that the foregoing working examples are given for the purpose of illustration and that any other suitable organic polyisocyanate, acid, phosphorous acid or the like could have been used in the working examples provided that the teachings of this disclosure are followed.

Although the invention has been described in considerable detail for the purpose of illustration, it is to be understood that variations can be made by those skilled in the art without departing from the spirit of the invention and scope of the claims.

What is claimed is:

1. A polyurethane plastic prepared by a process which comprises reacting an organic polyisocyanate with a phosphorous containing hydroxyl compound having a phosphorus content of at least about 2.5% by weight and a hydroxyl content of about 3 to about 25% by weight which has been prepared by a process which comprises reacting a phosphorous acid with at least one equivalent of, an alkylene oxide and at least 1 mol of an alpha,beta-unsaturated carboxylic acid per mol of phosporus acid.

2. The polyurethane plastic of claim 1 wherein a blowing agent is included to prepare a cellular polyurethane plastic.

3. A cellular polyurethane plastic prepared by a process which comprises reacting in the presence of a blowing agent an organic polyisocyanate with a phosphorus containing polyhydroxyl compound having a phosphorus content of at least about 2.5% by weight and a hydroxyl content of about 3 to about 25% by weight which has been prepared by a process which comprises reacting a phosphorous acid with at least one equivalent of an alkylene oxide and at least 1 mol of an alpha,beta-unsaturated discarboxylic acid per mol of phosphorus acid.

4. The cellular polyurethane plastic of claim 3 wherein said phosphorous acid is a mixture of phosphorous pentoxide and water.

5. The cellular polyurethane plastic of claim 3 wherein said phosphorous acid is a phosphorous acid corresponding to a mixture of about 35 to 67% $P_2O_3$ and the balance water.

6. The cellular polyurethane plastic of claim 3 wherein said alpha,beta-unsaturated dicarboxylic acid is maleic acid.

7. The cellular polyurethane plastic of claim 3 wherein said alkylene oxide is propylene oxide.

8. The polyurethane plastic of claim 1 wherein said acid is an alpha,beta-ethylenically unsaturated carboxylic acid.

9. The cellular polyurethane plastic of claim 3 wherein said phosphorus containing hydroxyl compound is prepared by reacting a phosphorus acid corresponding to a mixture of about 35 to 67% $P_2O_3$ and the balance water with an alkylene oxide and an alpha,beta-unsaturated carboxylic acid at a temperature of about 40 to about 100° C. until the phosphorus content of the polyol is at least about 2.5% by weight and the phosphorus polyol has an hydroxyl content of about 3 to 25% by weight.

References Cited

UNITED STATES PATENTS 3,317,639  5/1967  Hartman _____ 260—2.5

FOREIGN PATENTS 1,106,067  12/1959  Germany.
685,306  4/1964  Canada.

JAMES A. SEIDLECK, *Primary Examiner.*

R. W. MULCAHY, *Assistant Examiner.*

U.S. Cl. X.R.

260—77.5, 920